July 21, 1925.
G. M. AYRES
LAWN TRIMMER
Filed Sept. 12, 1922
1,546,463
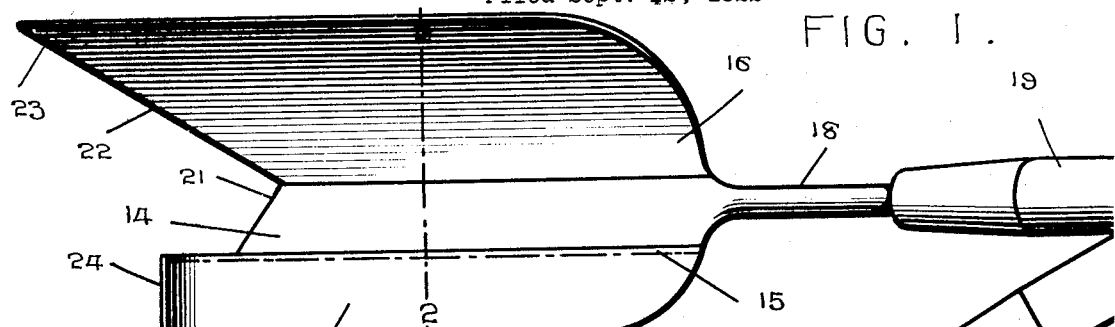
FIG. 1.
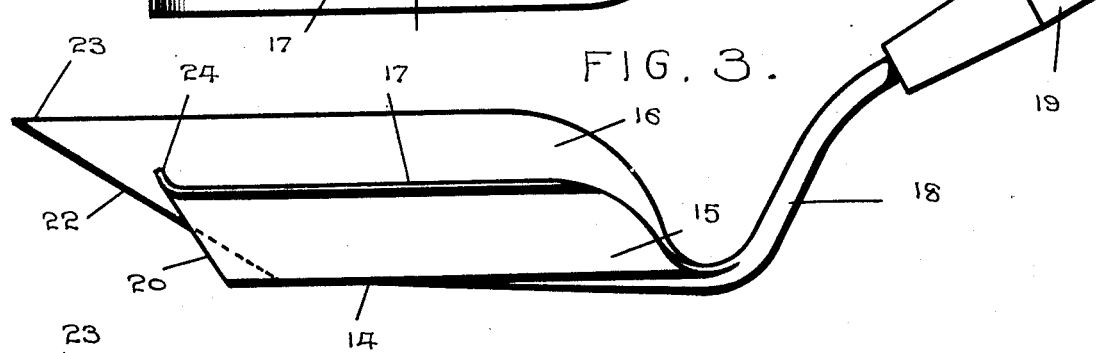
FIG. 3.
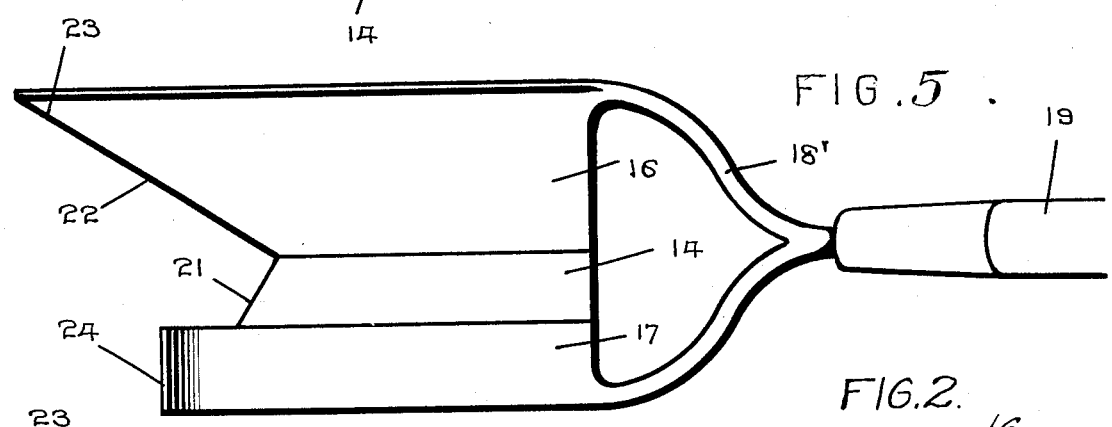
FIG. 5.
FIG. 2.
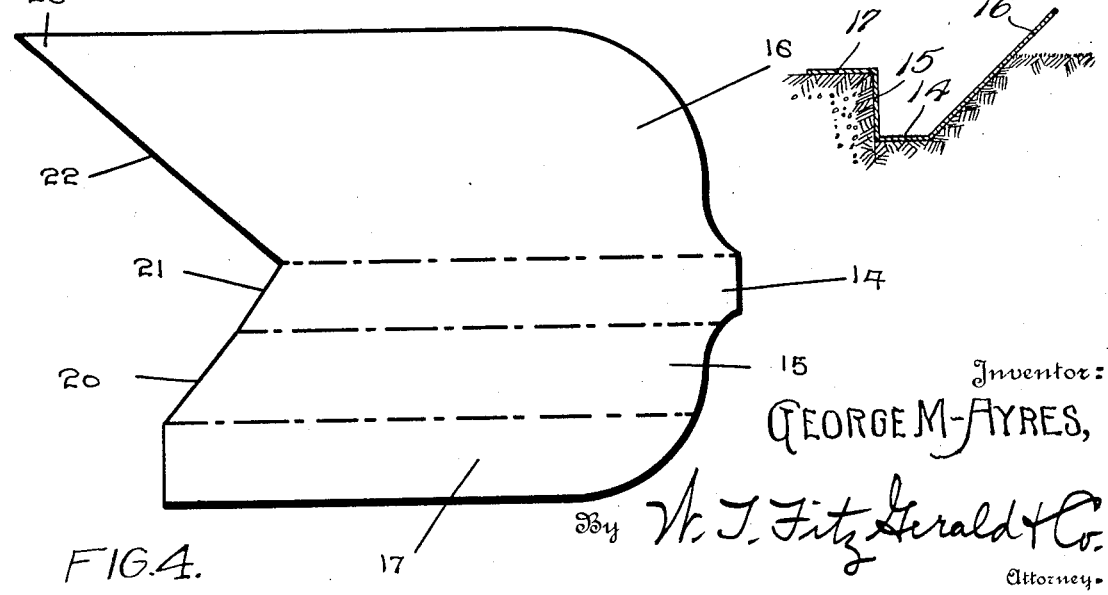
FIG. 4.
Inventor:
GEORGE M. AYRES,
By W. J. FitzGerald & Co.
Attorney.

Patented July 21, 1925.

1,546,463

UNITED STATES PATENT OFFICE.

GEORGE M. AYRES, OF CENTRAL CITY, NEBRASKA.

LAWN TRIMMER.

Application filed September 12, 1922. Serial No. 587,702.

*To all whom it may concern:*

Be it known that I, GEORGE M. AYRES, a citizen of the United States, residing at Central City, in the county of Merrick and State of Nebraska, have invented certain new and useful Improvements in Lawn Trimmers; and I do hereby declare the following to be a full, clear, and exact description of the invention, such as will enable others, skilled in the art to which it appertains, to make and use the same.

The present invention relates to an implement for trimming the edges of lawns along the edges of side-walks, curbs, and the like, and aims to provide a lawn trimmer of that kind which is of novel and improved construction to enhance the utility thereof.

Another object is the provision of a lawn trimmer having its cutting end so formed as to be particularly effective in trimming the edge of a lawn, and also for the further purpose of providing projecting cutting point or knife which can be used for trimming the lawn around trees, shrubs, and other objects on the lawn, as well as being useful for the purpose of removing weeds.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the device.

Fig. 2 is a cross section on the line 2—2 of Fig. 1 showing the implement as in use.

Fig. 3 is a side elevation of the implement.

Fig. 4 is a plan view of the blank from which the implement is formed.

Fig. 5 is a plan view of the implement illustrating a modified handle attachment.

The implement comprises a blade bent from a blank of sheet metal (shown in Fig. 4), and the blade comprises a bottom or intermediate portion 14, a vertical portion or wall 15 at one edge of the portion 14, an inclined wing 16 extending upwardly from the opposite edge of the bottom portion 14, and a flange or runner 17 extending from the upper edge of the portion 15 opposite to the wing 16. The portion 14 and runner flange 17 are horizontal, and all of said portions extend longitudinally of the line of movement of the implement when trimming the edge of a lawn. A shank 18 is united with the rear end of the portion 14 for the attachment of a suitable handle 19, and the blade is arranged at an obtuse angle with the handle for the convenient manipulation of the implement, the shank 18 being offset upwardly for the engagement of the lower end of the handle thereon.

The wall or portion 15 is adapted to bear against the edge or side of the side-walk or curb, as seen in Fig. 2, with the flange 17 bearing down on the side-walk or curb. The portion 14 defines the bottom of the trench cut in the turf or ground at the edge of the lawn, and the wing 16 defines the wall of the trench opposite to the side-walk or curb. The wing 16 extends upwardly above the plane of the flange 17, so as to be able to cut the turf if same is on a higher level than the surface of the side-walk or curb.

The forward end of the blade is formed with cutting edges to cleave the ground, grass and roots in an efficient manner. The forward ends of the portions 14 and 15 and wing 16 are sharpened, and the forward edge 20 of the portion 15 is inclined to extend downwardly and rearwardly from the forward end of the flange 17. The forward edge 21 of the portion 14 is disposed obliquely to extend rearwardly from the lower end of the edge 20, and the forward cutting edge 22 of the wing 16 is also disposed obliquely to extend upwardly and forwardly from the rear end of the cutting edge 21. The cutting edges 20 and 22 extending downwardly and rearwardly from the upper edges of the portion 15 and wing 16, respectively, will provide for clean cuts, and the ground, grass and roots cut loose between the portion 15 and wing 16 will be forced down by said cutting edges to pass between said portion 15 and wing 16. The cutting edge 22, as observed in Fig. 3, is arranged at a greater obtuse angle with the bottom portion 14 than the cutting edge 20 of the portion 15. The cutting edge 21 extending rearwardly from the portion 15 which bears against the side-walk or curb results in a side thrust by the cutting action of the edge 21, which will press the portion 15 against the side or edge of the side-walk or curb. The cutting edges being arranged obliquely will reduce to a minimum the resistance of the blade when shoved forwardly along the edge of the side-walk or curb in trimming the edge of a lawn, and the rear end of the blade is so formed as to offer minimum resistance to the grass and weeds which have been cut loose. The blade is also comparatively long and broad, and can be used as a shovel for lifting the loosened dirt, grass and weeds from the trench formed by the implement.

By making the wing 16 broad and arranging the cutting edge 22 at the angle shown, there is formed a sharp or pointed portion 23 projecting forwardly beyond the portions 14, 15 and 17, which is useful in removing weeds from the lawn and also for trimming the edge of the lawn around trees, shrubs, and other objects on the lawn. The point or portion 23 can be readily thrust into the ground for loosening and removing weeds, and the implement can be used for trimming the edge of a lawn around a tree or other object. In using the implement in this manner, it is turned so that the blade is in an inclined position with the point or prong 23 projecting downwardly so that it can be forced into the ground for using the cutting edge 22 to trim the edge of the lawn.

The forward end of the runner flange 17 is bent upwardly, as at 24, in order to pass over obstructions on the side-walk or curb along the edge thereof, to prevent the blade from catching or being stopped by such obstructions, in order that the flange will slide over such obstructions without interference.

Fig. 5 illustrates a modified form of handle attachment, in which a fork or bifurcated shank 18' for the handle has its terminals or arms connected to the rear ends of the flange 17 and wing 16, which is also of advantage inasmuch as the material loosened by the blade can pass under the fork 18' with minimum resistance.

Having thus described the invention, what is claimed as new is:—

A lawn trimmer comprising a blade having a bottom portion, a vertical portion extending upwardly from one edge of the bottom portion to bear against the side or edge of a side-walk or curb, a wing extending upwardly from the opposite edge of said bottom portion and inclined away from said vertical portion, and a flange extending from the vertical portion to slide on the side-walk or curb, said wing projecting above the plane of said flange, the forward end of the bottom portion having an oblique cutting edge extending rearwardly from the forward end of said vertical portion, the forward ends of said wing and vertical portion having inclined cutting edges extending downwardly and rearwardly from their upper edges to the corresponding ends of the cutting edge of said bottom portion, the forward end of said wing being at a greater obtuse angle with the bottom portion than the forward end of said vertical portion, the forward end of said wing being pointed and projecting beyond said bottom and vertical portions to be used for removing weeds from the lawn and for trimming the edge of the lawn, as described.

In testimony whereof I have signed my name to this specification in the presence of two subscribing witnesses.

GEORGE M. AYRES.

Witnesses:
 THOS. P. DUFF,
 R. H. JACOBSON.